(12) United States Patent
Obinata

(10) Patent No.: US 7,181,989 B2
(45) Date of Patent: Feb. 27, 2007

(54) DOUBLE SHAFT SUPPORTING CONSTRUCTION FOR AUTOMOTIVE AUTOMATIC TRANSMISSION

(75) Inventor: Jirou Obinata, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 207 days.

(21) Appl. No.: 10/914,213

(22) Filed: Aug. 10, 2004

(65) Prior Publication Data

US 2005/0044978 A1 Mar. 3, 2005

(30) Foreign Application Priority Data

Aug. 25, 2003 (JP) ............... P.2003-300138

(51) Int. Cl.
*F16H 3/08* (2006.01)
*F16H 3/38* (2006.01)
(52) U.S. Cl. ............................ 74/330; 74/340
(58) Field of Classification Search ............... 74/330, 74/331, 340
See application file for complete search history.

(56) References Cited

U.S. PATENT DOCUMENTS

| | | | | |
|---|---|---|---|---|
| 2,853,892 A | * | 9/1958 | Sheppard | ............ 74/330 |
| 3,906,817 A | * | 9/1975 | Kreitzberg | ............ 74/745 |
| 4,565,102 A | * | 1/1986 | Miyahara et al. | ............ 74/15.4 |
| 5,370,013 A | * | 12/1994 | Reynolds et al. | ............ 74/330 |
| 5,613,401 A | * | 3/1997 | Maurizio | ............ 74/325 |
| 5,853,342 A | | 12/1998 | Pritchard et al. | |

FOREIGN PATENT DOCUMENTS

| | | |
|---|---|---|
| EP | 0 848 190 A2 | 6/1998 |
| GB | 2159898 A * | 12/1985 |
| JP | 2001-323973 | 11/2001 |

* cited by examiner

*Primary Examiner*—Roger Pang
(74) *Attorney, Agent, or Firm*—Westerman, Hattori, Daniels & Adrian, LLP.

(57) ABSTRACT

A double shaft supporting construction for an automatic transmission includes an outer shaft having a plurality of gears and an inner shaft having a first gear fixed to the vicinity of a first end and a large-diameter portion integrally formed on the vicinity of a second end thereof, wherein a first bearing is interposed between the end of the inner shaft and a case of an automatic transmission, a second bearing is interposed between the large-diameter portion of the inner shaft and the case, a third bearing is interposed between the first end of the outer shaft and the first gear and a fourth bearing is interposed between the other end of the outer shaft and the large-diameter portion of the inner shaft.

1 Claim, 5 Drawing Sheets

DOUBLE SHAFT SUPPORTING CONSTRUCTION FOR AUTOMOTIVE AUTOMATIC TRANSMISSION

BACKGROUND OF THE INVENTION

The present invention relates to a double shaft supporting construction for an automotive automatic transmission.

There is known, for example, a construction as shown in FIG. 1 as a conventional double shaft supporting construction for an automotive automatic transmission. In FIG. 1, a gear 4 is integrally formed at an end portion of an inner shaft 2, and the gear 4 meshes with a gear 6. An outer shaft 8 is rotationally supported on the inner shaft 2 via a needle bearing 10. A gear 12 is integrally formed at the vicinity of an end portion of the outer shaft 8. A ball bearing is interposed between the end portion of the outer shaft 8 and a case 16.

In this double shaft supporting construction, a load inputted from the gear is inputted into the outer shaft 8 via the needle bearing 10 and is further borne by the case 16 via the ball bearing 14.

In this supporting construction, however, since a torsional bending as well as a bending load are inputted into the inner shaft 2 by virtue of a reaction force from the power transmission gear 4 and furthermore a shaft diameter which can bear the both loads is needed, there is caused a problem that the diameter and weight of the inner shaft are increased.

In addition, since the construction is such that the bending load borne by received by the gear 4 is borne by the needle bearing 10 and the ball bearing 14 via the inner shaft 2, a certain magnitude of strength is required for the inner shaft 2, this leading to a problem that the diameter of the inner shaft 2 is increased.

FIG. 2 shows another conventional example of a double shaft supporting construction for an automotive automatic transmission. In this double shaft supporting construction, an inner shaft 2 is supported in a case 16 via a roller bearing 18, and an outer shaft 8 is supported in the case via a ball bearing 14.

In this double shaft supporting construction, too, however, as in the case with the supporting construction shown in FIG. 1, a bending load and a torsional load are inputted into the inner shaft 2 due to a reaction force from a power transmission gear 4, and since a shaft diameter that can bear the both loads is needed, there is also caused the problem that the diameter and weight of the inner shaft 2 are increased.

[Patent Literature No. 1]
 JP-A-2001-323973

SUMMARY OF THE INVENTION

Thus, an object of the invention is to provide a double shaft supporting construction for an automatic transmission, which can enable the reduction in diameter and weight of the inner shaft.

According to a first aspect of the invention, there is provided a double shaft supporting construction for an automatic transmission including an outer shaft having a first end, a second end and a plurality of gears; an inner shaft having a first end, a second end, a first gear fixed to the vicinity of the first end and a large-diameter portion integrally formed on the vicinity of the second end; a first bearing interposed between the first end of the inner shaft and a case of the automatic transmission for rotationally supporting the first end of the inner shaft; a second bearing interposed between the large-diameter portion of the inner shaft and the case for rotationally supporting the large-diameter portion; a third bearing interposed between the first end of the outer shaft and the first gear for rotationally supporting the first end of the outer shaft; and a fourth bearing interposed between the second end of the outer shaft and the large-diameter portion of the inner shaft for rotationally supporting the second end of the outer shaft.

According to a second aspect of the invention, there is provided a double shaft supporting construction for an automatic transmission including an outer shaft having a first end, a second end and a plurality of gears; an inner shaft having a first end, a second end, a first gear fixed to the vicinity of the first end and a large-diameter portion integrally formed on the vicinity of the second end; a first bearing interposed between the first gear and the first end of the outer bear for rotationally supporting the first end of the inner shaft; a second gear interposed between the large-diameter portion of the inner shaft and a case of the automatic transmission for rotationally supporting the large-diameter portion; a third bearing interposed between the vicinity of the first end of the outer shaft and the case for rotationally supporting the first end of the outer shaft; and a fourth bearing interposed between the second end of the outer shaft and the large-diameter portion of the inner shaft for rotationally supporting the second end of the outer shaft.

According to the first ad second aspects of the invention, there are provided the double shaft supporting constructions in which the reaction force of the gear is directly borne by the outer shaft or the transmission case without passing through the inner shaft.

Thus, since the bending load due to the gear reaction force is prevented from being transmitted to the inner shaft and hence only the torsional rigidity required for the transmission of torque is secured for the inner shaft, the reduction in diameter and weight of the inner shaft can be attained.

In addition, since the double shaft construction is adopted, in the event that the diameter of the inner shaft is reduced, the diameter of the outer shaft can then be reduced, and hence a further reduction in weight and size of the double shaft construction can be attained.

DETAILED DESCRIPTION OF THE PREFERRED EMBODIMENTS

Figure 1:
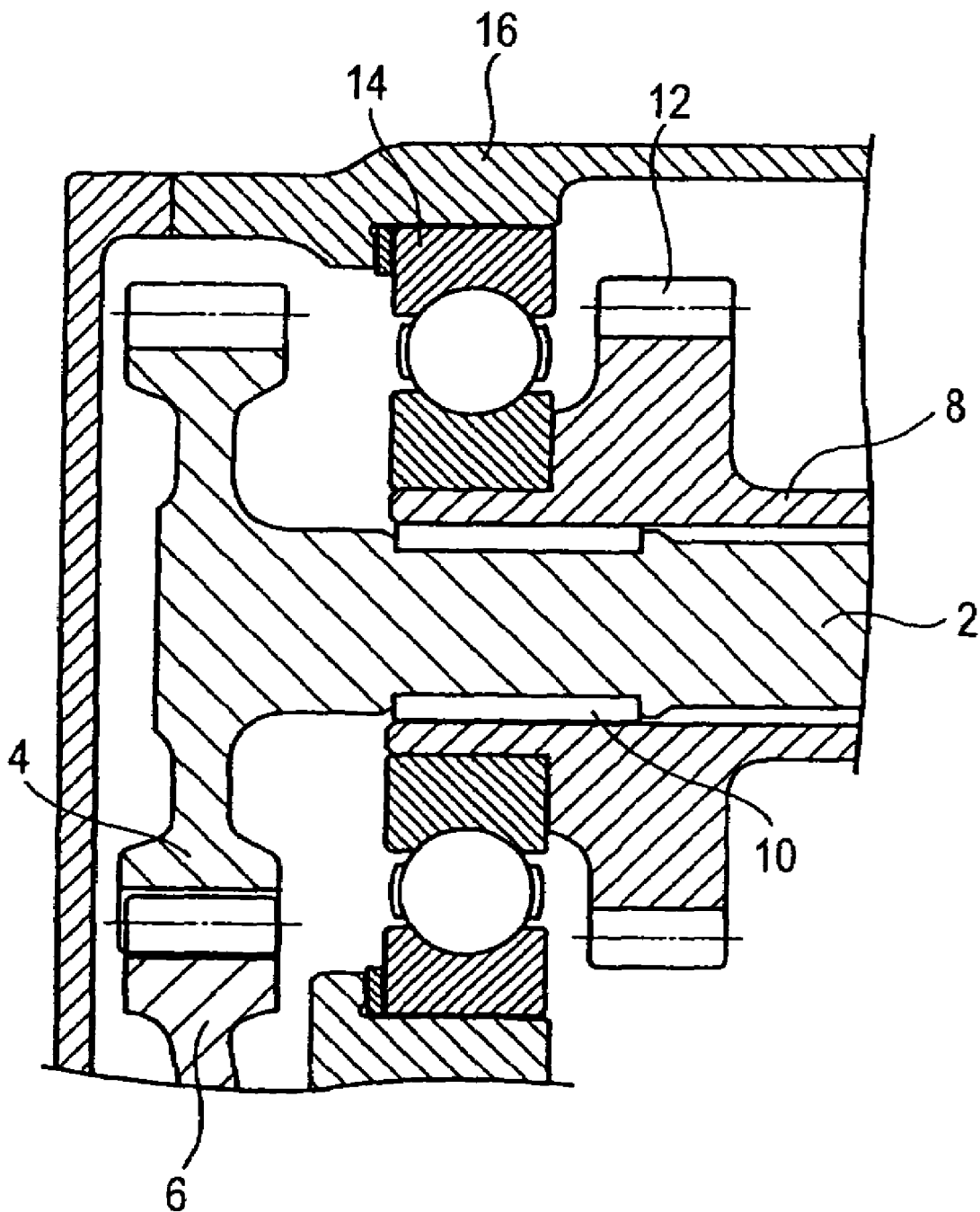
FIG. 1 is a longitudinally cross-sectional view showing an example of a conventional double shaft supporting construction.
Figure 2:
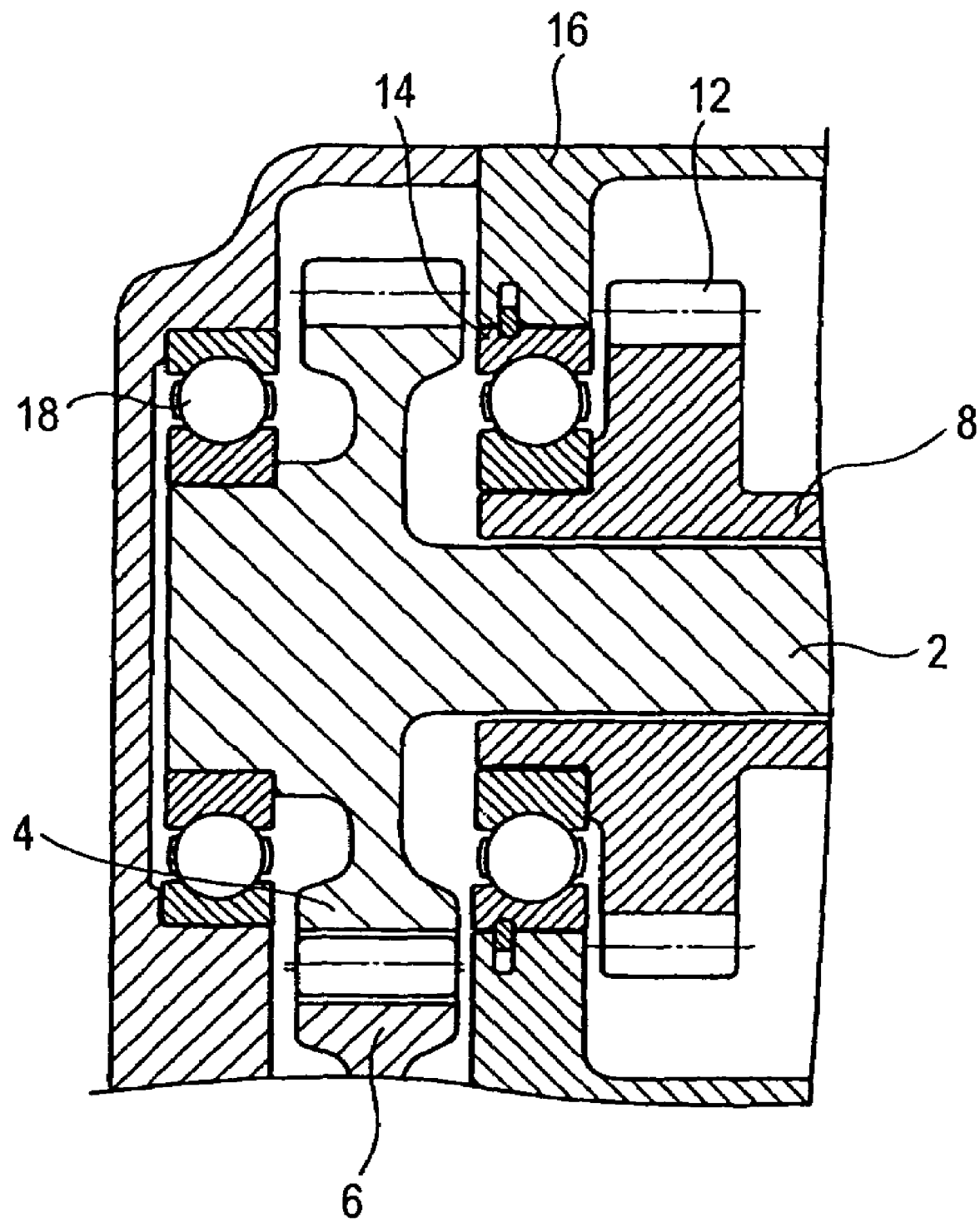
FIG. 2 is a longitudinally cross-sectional view showing another example a conventional double shaft supporting construction.
Figure 3:
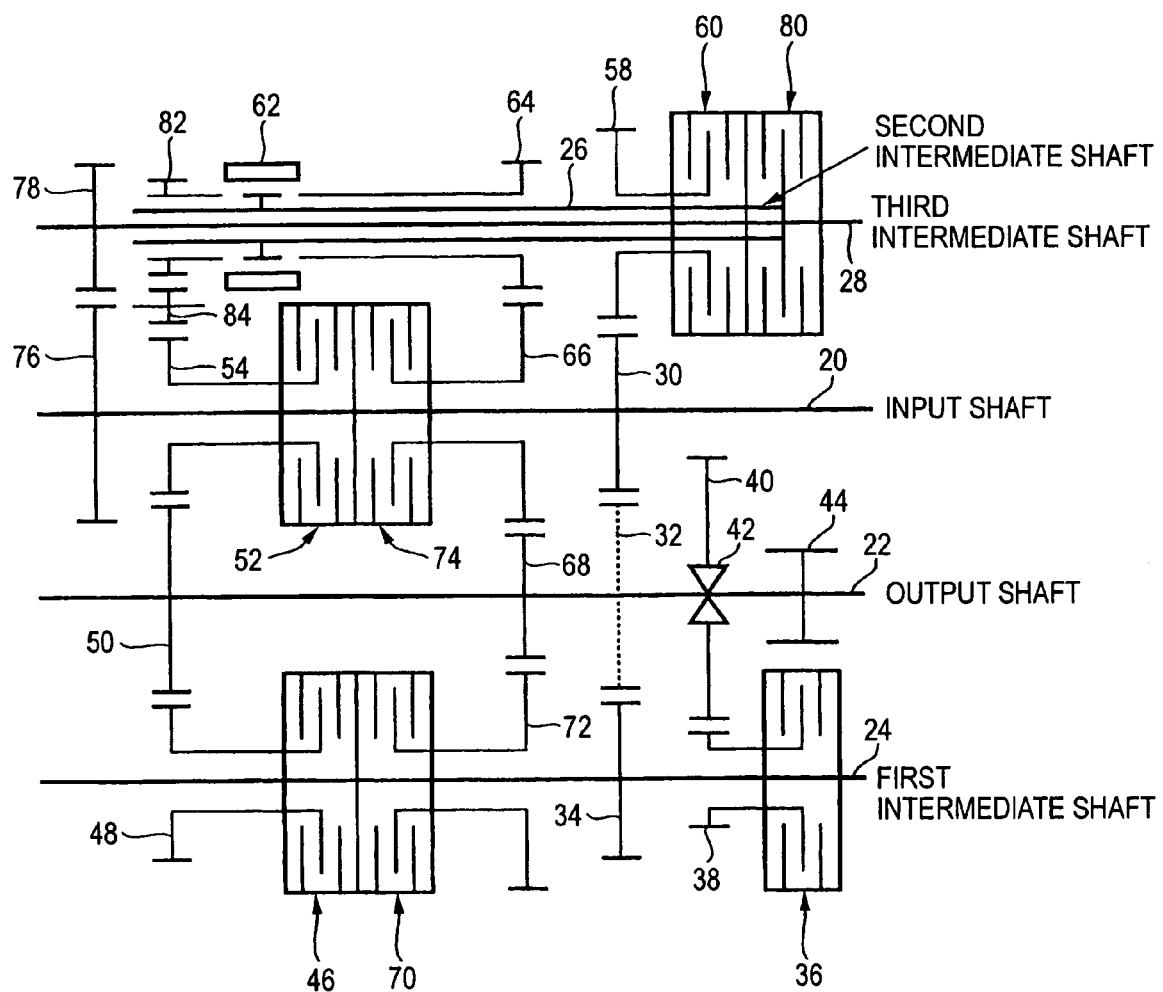
FIG. 3 is a schematic diagram showing the configuration of a seven-speed automatic transmission which adopts a double shaft supporting construction according to the invention.

Referring to FIG. 3, a schematic diagram of the configuration of a seven-speed automatic transmission is shown which adopts a double shaft construction according to the invention. An input shaft 20, an output shaft 22, a first intermediate shaft 24, a second intermediate shaft 26 and a third intermediate shaft 28 are provided in parallel with one another.

The input shaft 20 is connected to a turbine runner of a torque converter, not shown. Hereinafter, a power transmission path for each of a first-speed (low) to a seventh-speed gears will be described.

In the case of the first-speed gear, the rotation of the input shaft 20 is transmitted to a gear 30 fixed to the input shaft 20, an idler gear 32, a gear 34 fixed to the first intermediate shaft 24, a first-speed clutch (a low clutch) 36, a gear 38, a gear 40 attached to the output shaft 22 via a one-way clutch 43, the output shaft 22 and a final drive gear 44 fixed to the output shaft 22.

The final drive gear 44 meshes with a final driven gear, not shown, and after being reduced in speed by a final gear ratio between the final drive gear 44 and the final driven gear, the rotation of the output shaft is transmitted to a differential, not shown, whereby left and right drive wheels rotate in a forward direction.

In the case of a second-speed gear, the rotation of the input shaft 20 is transmitted to the final drive gear 44 via the gear 30, the idler gear 32, the gear 34, the first intermediate gear 24, a second-speed clutch 46, a gear 48, a gear 50 fixed to the output shaft 22 and the output shaft 22.

In the case of a third-speed gear, the rotation of the input shaft 20 is transmitted to the final drive gear 44 via a third-speed clutch 52, a gear 54, the gear 50 and the output shaft 22.

In the case of a fourth-speed gear, the rotation of the input shaft 20 is transmitted to the final drive gear 44 via the gear 30, a gear 58, a fourth-speed clutch 66 which doubles as a reverse clutch, the second intermediate shaft 26, a synchromesh mechanism (F/R chamfer) 62, a gear 64, a gear 66, a gear 68 and the output shaft 22.

In the case of a fifth-speed gear, the rotation of the input shaft 20 is transmitted to the final drive gear 44 via the gear 30, the gear 32, the gear 34, the first intermediate shaft 24, a fifth-speed clutch 70, a gear 72, the gear 68 and the output shaft 22.

In the case of a sixth-speed gear, the rotation of the input shaft 20 is transmitted to the final drive gear 44 via a sixth-speed clutch 74, the gear 66, the gear 68 and the output shaft 22.

In the case of the seventh-speed gear, the rotation of the shaft 20 is transmitted to the final drive gear 44 via a gear 76 fixed to the input shaft 22, a gear 78 fixed to the third intermediate shaft 28, the third intermediate shaft 28, a seventh-speed clutch 80, the intermediate shaft 26, the synchromesh mechanism 62, the gear, 64, the gear 68 and the output shaft 22.

On the other hand, in the case of a reverse drive, the rotation of the input shaft 20 is transmitted to the final drive gear 44 via the gear 30, the gear 58, the fourth-speed gear clutch which doubles the reverse clutch 60, the second intermediate shaft 26, the synchromesh mechanism 62, a gear 82, an idler gear 84, the gear 54, the gear 50 and the output shaft 22.

Here, the gear 68 fixed to the output shaft 22 is a gear which is commonly used for the fourth-speed, the fifth-speed, the sixth-speed and the seventh-speed gears. Similarly, the gear 50 fixed to the output shaft 22 is a gear which is commonly used for the second-speed, the third-speed and the reverse gears.

Figure 4:
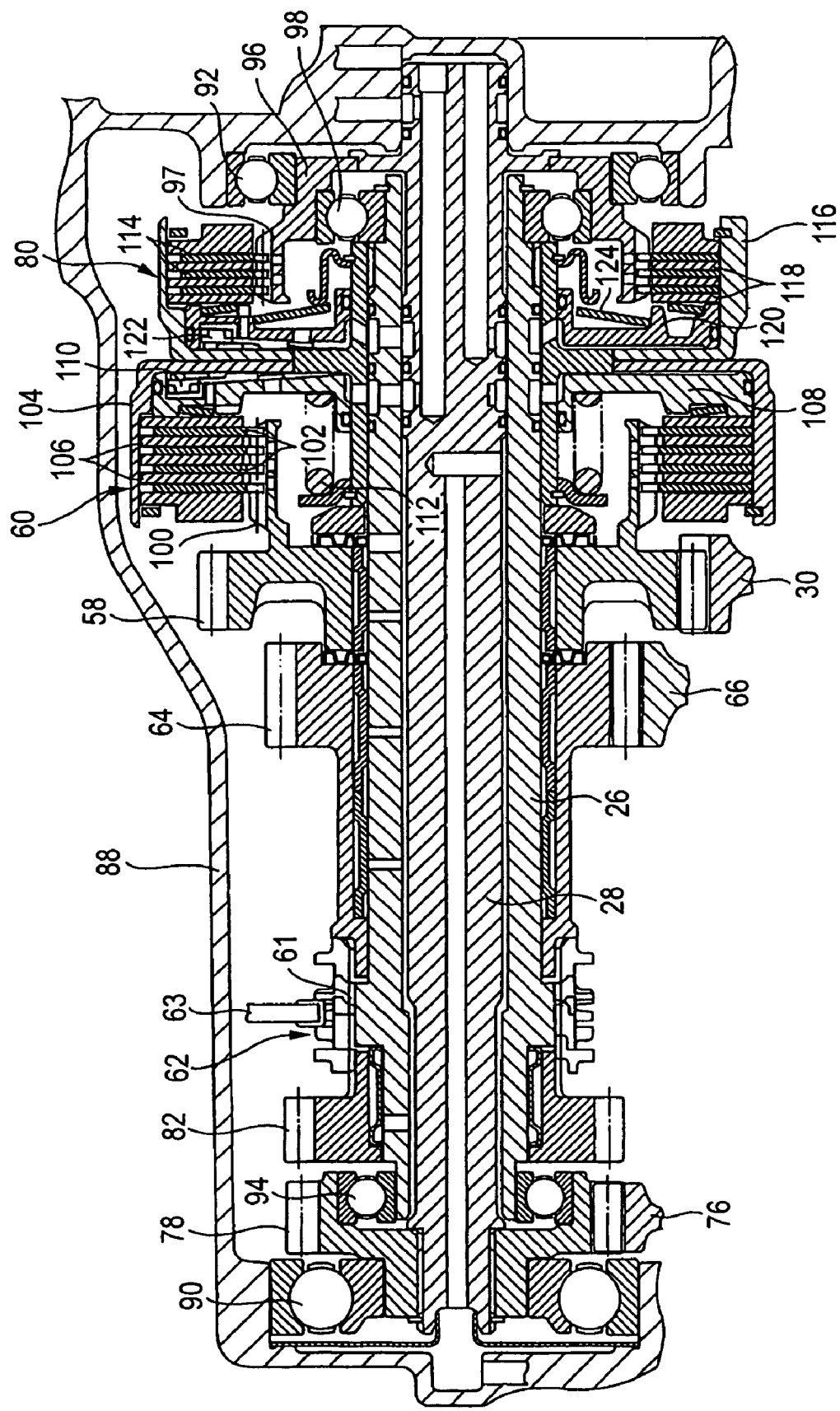
FIG. 4 is a longitudinally cross-sectional view of a double shaft supporting construction according to a first embodiment of the invention.

Next, referring to a longitudinally cross-sectional view shown in FIG. 4, the double shaft supporting construction for the automotive automatic transmission, which constitutes a feature of the invention will e described in detail. A gear 78 is spline fitted on a first end (a left end) of the inner shaft 28 which is the third intermediate shaft.

A ball bearing 90 is interposed between a transmission case 88 and the gear 78, so that the first end of the inner shaft 28 is rotationally supported relative to the transmission case 88.

A ball bearing 94 is interposed between a first end (a left end) of the outer shaft 26 which is the second intermediate shaft, so that the first end of the outer shaft 26 is rotationally supported relative to the inner shaft 28.

A large-diameter portion 96 is integrally formed at the vicinity of a second end (a right end) of the inner shaft 28. A ball bearing 92 is interposed between the large-diameter portion 96 and the transmission case 88, so that the large-diameter portion of the inner shaft 28 is rotationally supported relative to the transmission case 88.

A ball bearing 98 is interposed between a second end (a right end) of the outer shaft 26 and the large-diamter portion of the inner shaft 28, so that the second end of the outer shaft 26 is rotationally supported relative to the inner shaft 28.

The gear 58, the gear 64 and the gear 82 are rotationally attached to the outer shaft 26, and the synchromesh mechanism 62 is attached to the outer shaft 26 through a spline 61 in such a manner that the synchromesh mechanism 62 does not rotate but moves axially relative to the outer shaft 26. The synchromesh mechanism 62 is caused to slide leftward and rightward by a shift fork 63.

The fourth-speed and reverse clutch 60 includes an inner hub 100 which is formed as an integral part of the gear 58. A plurality of clutch discs 102 are attached to the inner hub 100 in such a manner as not to rotate but to move axially.

Furthermore, a plurality of clutch plates 106 are attached to a clutch guide 104 fixed to the outer shaft 26 in such a manner as not to rotate but to move axially, the clutch plates 106 being disposed alternately with the clutch discs 102.

Reference numeral 108 denotes a clutch piston, and a piston compartment 110 is defined between the clutch guide 104 and the clutch piston 108. When no hydraulic pressure is inducted into the piston compartment 110, the clutch 60 is made to be off by virtue of the biasing force of a return spring 112.

When a hydraulic pressure is inducted into the piston compartment 110, the clutch piston 108 is moved leftward in the figure against the biasing force of the return spring 112, whereby the clutch plates 106 are pressed against the clutch discs 102 rigidly, and the clutch 60 is applied.

The seventh-speed clutch 80 includes an inner hub 97 which is formed as an integral part of the large-diameter portion 96 of the inner shaft 28. A plurality of clutch discs 114 are attached to the inner hub 97 in such a manner as not to rotate but to move axially.

Furthermore, a plurality of clutch plates 118 are attached to a clutch guide 116 fixed to the outer shaft 26 in such a manner as not to rotate but to move axially, the clutch plates 118 being disposed alternately with the clutch discs 114.

Reference numeral 120 denotes a clutch piston, and a piston compartment 122 is defined between the clutch guide 116 and the clutch piston 120. When no hydraulic pressure is inducted into the piston compartment 122, the clutch 80 is made to be off by the biasing force of a coned disc spring 124 which acts as a return spring.

When a hydraulic pressure is inducted into the piston compartment 122, the clutch piston 120 is moved rightward in the figure against the biasing force of the coned disc spring 124, whereby the clutch plates 118 are pressed against the clutch discs 114 rigidly and the clutch 80 is applied.

As is described heretofore, according to the double shaft supporting construction according to the embodiment, on the first end (left end) side, since a bending load from the gear 82 is transmitted to the gear 78 via the ball bearing 94 and is further is borne by the transmission case 88 via the ball bearing 90, the application of bending load to the inner shaft 2 can be suppressed, thereby making it possible to reduce the diameter of the inner shaft 28.

On the other hand, on the second end (right end) side, since a bending load from the gear 58 or the gear 64 is transmitted to the large-diameter portion 96 of the inner shaft 28 via the ball bearing 98 and is further borne by the transmission case 88 via the ball bearing 92, the application of bending load to the inner shaft 28 can be suppressed, thereby making it possible to reduce the diameter of the inner shaft 28.

Figure 5:
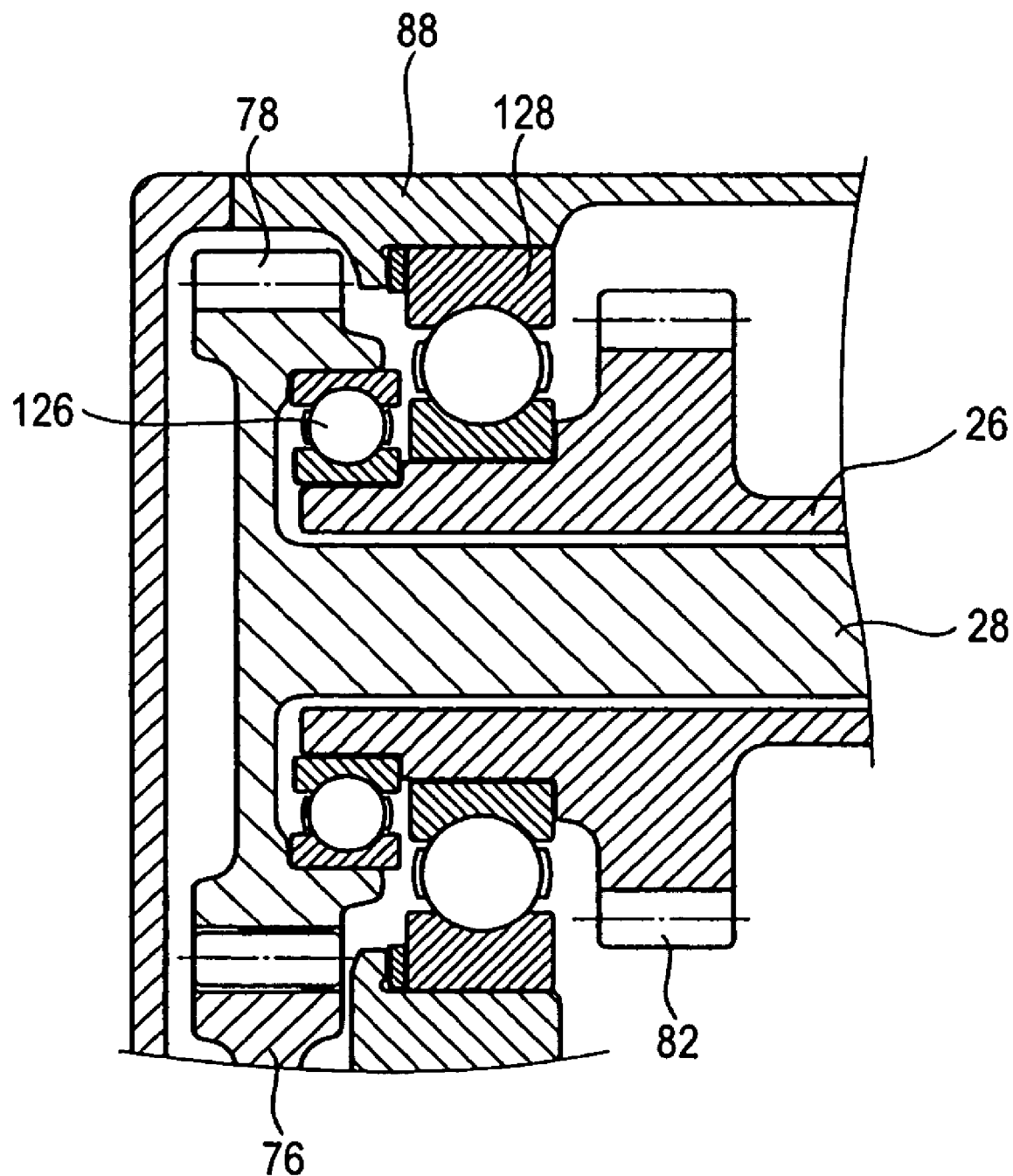
FIG. 5 is a drawing showing a part of a longitudinally cross-sectional view of a double shaft supporting construction according to a second embodiment of the invention.

Referring to FIG. 5, a part of a longitudinally cross-sectional view of a double shaft supporting construction according to a second embodiment of the invention is shown. This embodiment provides an alternative form to the left end side supporting construction explained in FIG. 4, while a right end side supporting construction thereof is similar to the right end side supporting construction of the embodiment shown in FIG. 4.

A gear 78 is fixed to a first end (a left end) of an inner shaft 28. A ball bearing 128 is interposed between the vicinity of a first end (a left end) of an outer shaft 26 and a transmission case 88, so that the left end of the outer shaft 26 is rotationally supported relative to the transmission case 88.

A ball bearing 126 is interposed between the left end of the outer shaft 26 and an inner circumference of the gear 78, so that the left end of the inner shaft 28 is supported reltive to the outer shaft 26.

According to the second embodiment, a stress applied by the gear 78 at the time of power transmission is transmitted to the outer shaft 26 via the ball bearing 126 and is further borne by the transmission case 88 via the ball bearing 128. Thus, since the application of bending load to the inner shaft 28 can be suppressed, thereby making it possible to reduce the diameter of the inner shaft 28.

What is claimed is:

1. A double shaft supporting construction for an automatic transmission comprising:

an outer shaft having a first end, a second end and a plurality of gears;

an inner shaft having a first end, a second end, a first gear fixed to the vicinity of the first end and a large-diameter portion, larger than the first end of the inner shaft, integrally formed on the vicinity of the second end;

a first bearing interposed between the first end of the inner shaft and a case of the automatic transmission for rotationally supporting the first end of the inner shaft;

a second bearing interposed between the large-diameter portion of the inner shaft and the case for rotationally supporting the large-diameter portion;

a third bearing supported by the first end of the outer shaft and the first gear for rotationally supporting the first end of the outer shaft with respect to the first gear; and a fourth bearing supported by the second end of the outer shaft and the large-diameter portion of the inner shaft for rotationally supporting the second end of the outer shaft with respect to the large-diameter portion.

* * * * *